No. 677,478. Patented July 2, 1901.
H. G. SMITH.
AGRICULTURAL IMPLEMENT TOOTH.
(Application filed Feb. 21, 1901.)
(No Model.)
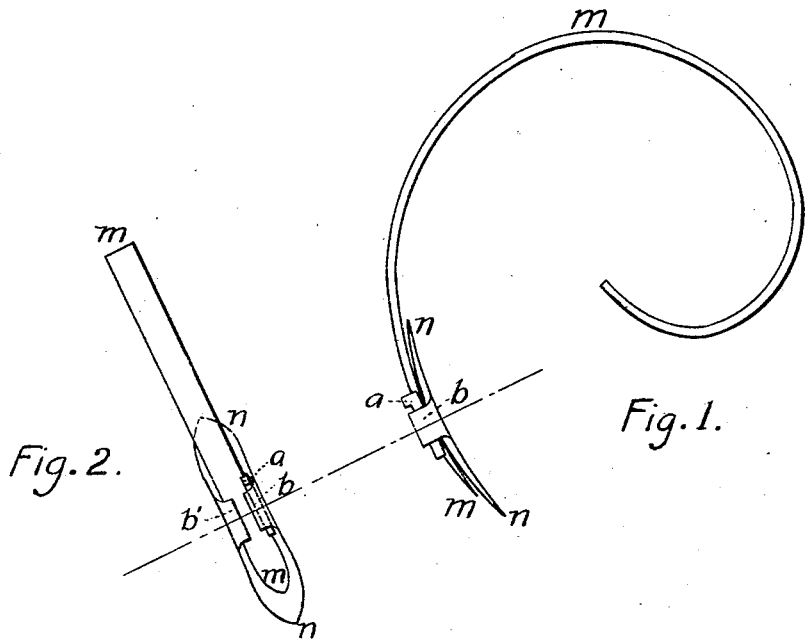
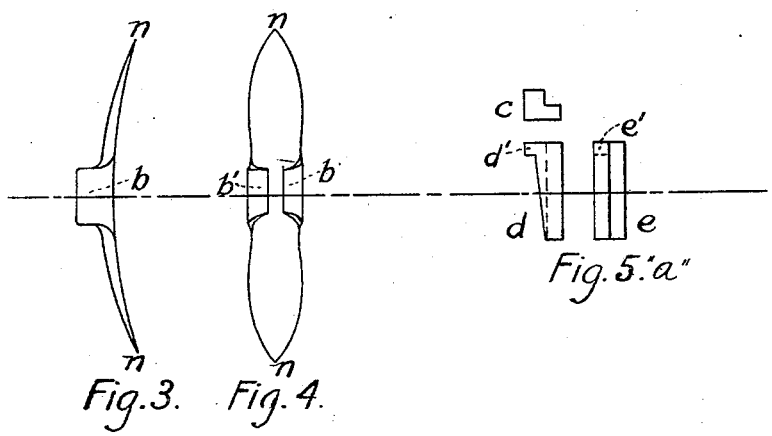
Witnesses.
Eugene Terry.
J. H. Elston.
Inventor.
Henry G. Smith
per
Theodore K. Bryant
Attorney.

UNITED STATES PATENT OFFICE.

HENRY G. SMITH, OF ITHACA, NEW YORK.

AGRICULTURAL-IMPLEMENT TOOTH.

SPECIFICATION forming part of Letters Patent No. 677,478, dated July 2, 1901.

Application filed February 21, 1901. Serial No. 48,331. (No model.)

*To all whom it may concern:*

Be it known that I, HENRY G. SMITH, a citizen of the United States, residing at Ithaca, in the county of Tompkins and State of New York, have invented a new and useful Improvement in Agricultural-Implement Teeth, of which the following is a specification.

My invention relates to improvements in agricultural-implement teeth and the mechanical device for attaching the same; and the objects of my improvement are, first, that the double-end reversible tooth-point hereinafter described may be more firmly and substantially attached, and, second, that by the use of my device said tooth-point may be attached with greater facility, and in so doing the person so attaching may be relieved from the necessity of using a wrench, nuts, bolts, or other complicated device. I attain these objects by the mechanism illustrated in the accompanying drawings, in which—

Figure 1 is a side view of a harrow or other agricultural-implement tooth complete, together with the double-end reversible tooth-point attached with my device, hereinafter described. Fig. 2 shows a rear view of the same. Fig. 3 shows a side view of the double-end reversible tooth-point detached. Fig. 4 shows a rear view of the double-end reversible tooth-point detached. Fig. 5 shows three different views of my wedge-shaped cotter or key with which the said double-end reversible tooth-point is attached to the harrow or other agricultural-implement tooth.

Similar letters refer to similar parts throughout the several views.

In Fig. 1, *a* shows the wedge-shaped cotter or key, which consists of a right-angle-shaped piece of metal or other material driven into position longitudinally from above and parallel with both the double-end reversible point and the permanent tooth.

In Fig. 4, showing double-end reversible tooth-point, *b* and *b'* represent flanges or integral side wings turned back from its central position. The wings or flanges may be of equal or unequal width, so that they may be readily hooked over and clasped to the permanent tooth. It is obvious also that the double-end reversible tooth-point must be slightly wider than the permanent tooth from the inside of the flanges or wings, so as to admit of the wedge-shaped cotter or key or one side thereof, and the other side of said cotter or key will lie over the edge and side of the permanent tooth, so that when the said wedge-shaped cotter or key is forced downwardly it will force the permanent tooth tightly and securely against the opposite side of said flange.

In Fig. 5, showing different views of the cotter or key, *c* represents a section view of said cotter or key. *e* represents said cotter or key as viewed diagonally from the open side thereof. *d* represents said cotter or key as viewed from the closed side thereof. *d'* and *e'* represent a projecting lip or head of said cotter or key, by which the said cotter or key may be easily driven from its position when attached to the permanent tooth and double-end reversible tooth-point.

I am aware that prior to my invention reversible double-end tooth-points for harrows and other agricultural implements have been used. I therefore do not claim such a combination broadly; but What I do claim as my invention, and desire to secure by Letters Patent, is—

1. The combination with the permanent tooth of a harrow or like implement, of the double-end reversible tooth-point described consisting of a plate with integral side wings turned back from its central position the inside of said wings being of greater width than the permanent tooth and the wedge-shaped key shown and described inserted so that the same will lie over the edge and side of the permanent tooth and force the same into position substantially as shown and described.

2. The combination with the permanent tooth of a harrow or like implement of the double-end reversible tooth-point, a right-angular-shaped key having projecting head and parallel with both the double-end reversible tooth-point and the permanent tooth and directly engaging the same substantially as shown and described.

HENRY G. SMITH.

Witnesses:
 M. M. SWEETLAND,
 J. COOK RIDALL.